United States Patent [19]

Rouse

[11] Patent Number: 4,750,437
[45] Date of Patent: Jun. 14, 1988

[54] METHOD FOR DISPOSAL OF WASTE MATERIALS BY INCINERATION

[75] Inventor: Michael W. Rouse, West Linn, Oreg.

[73] Assignee: Waste Recovery, Inc., Dallas, Tex.

[21] Appl. No.: 13,470

[22] Filed: Feb. 11, 1987

[51] Int. Cl.⁴ ............................................. F23G 5/033
[52] U.S. Cl. ....................... 110/346; 110/101 CF; 110/104 R; 110/220; 110/222; 110/237; 110/238
[58] Field of Search ................................ 110/218–220, 110/222, 232–235, 101 R, 101 C, 101 CF, 104 R, 105, 106, 346, 185, 186, 237, 238, 246, 293

[56] References Cited

U.S. PATENT DOCUMENTS

| | | | |
|---|---|---|---|
| 3,584,587 | 6/1971 | Siracusa | 110/222 |
| 3,670,669 | 6/1972 | Hoad | 110/222 X |
| 3,794,565 | 2/1974 | Bielski et al. | 110/246 X |
| 3,815,521 | 6/1974 | Panning | 110/ |
| 3,865,053 | 2/1975 | Kolze et al. | 110/104 X |
| 3,951,081 | 4/1976 | Martin et al. | 110/106 X |
| 4,015,546 | 4/1977 | Paules | 110/220 X |
| 4,022,630 | 5/1977 | Watson et al. | 106/103 |
| 4,044,695 | 8/1977 | Mackenzie et al. | 110/220 |
| 4,081,285 | 3/1978 | Pennell | 106/100 |
| 4,121,524 | 10/1978 | Voelskow et al. | 110/220 |
| 4,133,273 | 1/1979 | Glennon | 110/237 X |
| 4,203,376 | 5/1980 | Hood | 110/246 X |
| 4,270,470 | 6/1981 | Barnett et al. | 110/222 X |
| 4,437,419 | 3/1984 | Hertel | 110/259 |

Primary Examiner—Steven E. Warner
Attorney, Agent, or Firm—Chernoff, Vilhauer, McClung & Stenzel

[57] ABSTRACT

A method for disposing of waste materials including wastes generated by residential neighborhoods and business districts of a municipal area, by collecting waste materials centrally, sorting out and removing non-combustible materials from the collected wastes, and shredding the combustible materials coarsely. The coarsely shredded materials are then transported, if necessary, to the location of an incinerator or other furnace into which the materials are fed as fuel at a rate controlled in accordance with the requirements of the burner for complete and clean combustion, by feeding the coarsely shredded materials into a further shredder, shredding the materials to a final size, and immediately conveying the reshredded materials into the burner. Transportation and measurement of the coarsely shredded materials is thus accomplished with the waste materials at an optimum density for convenient handling and transportation at an economical cost.

13 Claims, 3 Drawing Sheets

METHOD FOR DISPOSAL OF WASTE MATERIALS BY INCINERATION

BACKGROUND OF THE INVENTION

The present invention relates to disposal of waste materials such as those generated by a metropolitan residential and business areas, and particularly to a method for economical transportation and use of such waste materials as fuel.

Waste disposal has long been a serious problem for cities, since landfill disposal sites are expensive to acquire and require careful preparation in order to avoid permanent pollution of nearby ground water supplies. Landfills are of inherently limited capacity, and their presence is generally detrimental to the values of nearby property, making selection of landfill waste disposal sites a politically difficult problem. On the other hand, incineration of wastes from metropolitan areas also presents problems which are difficult to resolve, since incineration generates particulate and gaseous products of combustion which tend to pollute the air, as well as ash and clinker which must also be disposed of. U.S. Pat. Nos. 4,081,285 and 4,022,630 disclose the use of municipal waste materials as supplemental fuel in cement kilns, with the resulting ash being included in the clinker used to produce cement. This sort of process, however, has certain drawbacks, most notably the expense of transportation of the normal municipal wastes, which may include materials as widely varied as discarded rubber tires, plastics materials, paper products, and tin cans. Where the site of an incinerator, cement kiln, or other burner is located a significant distance from the metropolitan center, it is very expensive to transport the waste materials to be burned unless they are in a densified or compacted form.

Economical conversion of waste materials, from the form in which they are collected locally into a form in which they are easily and conveniently fed into a burner, and in which they will burn rapidly enough to be completely consumed, typically requires large, expensive machinery. Ideally, such machinery should be capable of handling waste materials at a high enough rate to dispose of all of the materials collected each day, but the rate of collection varies depending on the day of the week, and the machinery will require some time for maintenance and repair. The rate of combustion of waste materials is ideally more uniform than the rate of collecting materials, in order to achieve the cleanest and most complete combustion of the waste materials.

However, if municipal wastes are shredded into the form in which they are best adapted to be used as fuel, the material is difficult to handle, being of relatively low density. This makes transportation less economical because of the relatively high volume required, and makes it difficult to feed the shredded waste material into a burner at a well-defined rate which will provide for an even rate of combustion. Waste materials which have been shredded into particles small enough to be fed pneumatically into a furnace may have two or three times the volume of the same material in the form of larger pieces. If the waste material has not been reduced to pieces of small size, it is more difficult to feed into the combustion zone of a furnace and will not burn as easily. Small pieces, on the other hand, are easily transported into the zone of combustion in a cement kiln, for example, by a stream of moving gas.

The general problem presented has been addressed previously, as is described in Siracusa U.S. Pat. No. 3,584,587 and Hertel U.S. Pat. No. 4,437,419, which disclose separation of magnetic materials from municipal wastes, shredding the materials, and eventual incineration of the shredded non-magnetic materials. Neither of these patents, however, teaches a way to overcome the problems of producing and handling finely divided waste materials of low density economically, and both of those patents contemplate storage of the waste materials in a finely shredded form for some period of time prior to incineration. Panning U.S. Pat. No. 3,815,521 discloses an incinerator equipped with a shredder, a compactor for shredded materials, and a feed apparatus for delivering shredded materials in a bale-like form into the furnace of an incinerator. This naturally results in a batch fueling of the incinerator, rather than a more desirable continuously fueled fire.

A related problem is that of disposal of materials which are hazardous to health, but which can be rendered harmless by proper incineration. Such wastes must be controlled carefully before incineration, whether solid, liquid or gaseous.

What is needed, therefore, is a method for collecting and economically preparing municipal wastes for use as fuel, and for feeding such material into a burner continuously at an accurately controlled rate, so that most or all of the combustible wastes can be used effectively as fuel to provide high temperatures and economically useful amounts of heat energy. It is also very desirable to incorporate in such a method the ability to collect municipal waste materials initially at centralized locations from which waste materials may be transported to an incinerator site, and the ability to dispose safely of hazardous materials.

SUMMARY OF THE INVENTION

The present invention overcomes the aforementioned shortcomings and disadvantages of previously used systems and methods for disposal of waste materials from a metropolitan area, by providing an improved method for handling such waste materials including the steps of collecting and accumulating waste materials at a centralized location, where the collected materials are shredded coarsely in preparation for further transportation. Non-combustible materials are removed from the collected waste materials to the extent practical, either before or after they are shredded coarsely, although removal of non-combustible materials will usually be simplified if it follows shredding. Preferably, substantially all magnetic materials and most other non-combustible materials are removed at this point. The manner in which this is accomplished, however, does not form a part of the present invention.

Thereafter, the coarsely shredded waste materials are transported, if necessary, to the site of a lime kiln, cement kiln, or other incinerator in which the waste materials are to be consumed by combustion. The coarsely shredded waste materials are thus transported as pieces which are smaller and more similar in size than the initial size, so that irregular and large pieces of refuse are made more compact and can be handled more readily than when collected initially, yet the waste materials are not reduced to such small pieces that they are fluffy and difficult to handle, contain and measure.

In this preferred coarsely shredded form, the waste materials are fed at a controlled rate into a secondary shredder or the like which reduces the size of the pieces to that required for effective pneumatic feeding of the finally shredded materials into an incinerator. Preferably, the pieces of waste material are reduced in size to the extent required for efficient transportation in a stream of gas from the shredder to the combustion zone of a cement kiln or other incinerator. In most cases it is preferred to recirculate some of the heated gases resulting from combustion to provide a great enough flow of gas to transport such materials and avoid unnecessary cooling of the zone of combustion, while some ambient air is also used, to maintain a sufficient supply of oxygen for efficient combustion.

Air used to carry fuel into the incinerator is drawn from around the secondary shredder and its associated feed apparatus, in order to control dust, and gaseous or liquid hazardous materials may be introduced into the stream of air in small quantities to be fed into the incinerator. Similarly, solid, or semi-solid hazardous waste materials may be introduced into the secondary shredder in small quantities to be shredded and then rendered harmless by incineration.

It is therefore a principal object of the present invention to provide an improved method for disposal of waste materials such as those generated by businesses and residences within a metropolitan district.

It is another major object of the present invention to provide for transportation of municipal waste materials from points of collection to burner or incinerator sites more economically than has been possible previously.

It is yet a further object of the present invention to provide for incineration of municipally generated waste materials, including certain hazardous wastes, with an improved ability to control the rate and completeness of incineration.

It is a principal feature of the present invention that it provides a method for preparation of waste materials for incineration by shredding such materials coarsely and thereafter feeding coarsely shredded materials at a controlled rate into a further shredder from which finely shredded materials are directly fed immediately into the burner in which they are used as fuel.

It is a further feature of the present invention that it teaches the method of handling municipal waste materials by first coarsely shredding and sorting such materials and thereafter transporting and metering the combustible waste materials in a coarsely shredded form and immediately reshredding and burning such waste materials at the rate at which they are delivered into a secondary shredding apparatus.

Yet a further feature of the invention is the controlled recycling of furnace exhaust gases to help to maintain required temperatures while pneumatically transporting fuel to a combustion zone.

A principal advantage of the present invention is that it provides a method for more convenient and economical handling of municipal waste materials than has been available in the past, since initial collection, sorting, and coarse shredding can be accomplished on a relatively small area of land, and coarsely shredded wastes can be transported economically to short term storage sites or to more distant sites where incineration is to take place.

Another important advantage of the present invention is that it provides a more economical method of transportation of collected waste materials than has been previously known.

The foregoing and other objectives, features, and advantages of the invention will be more readily understood upon consideration of the following detailed description of the invention, taken in conjunction with the accompanying drawings.

DETAILED DESCRIPTION OF THE INVENTION

Figure 1:
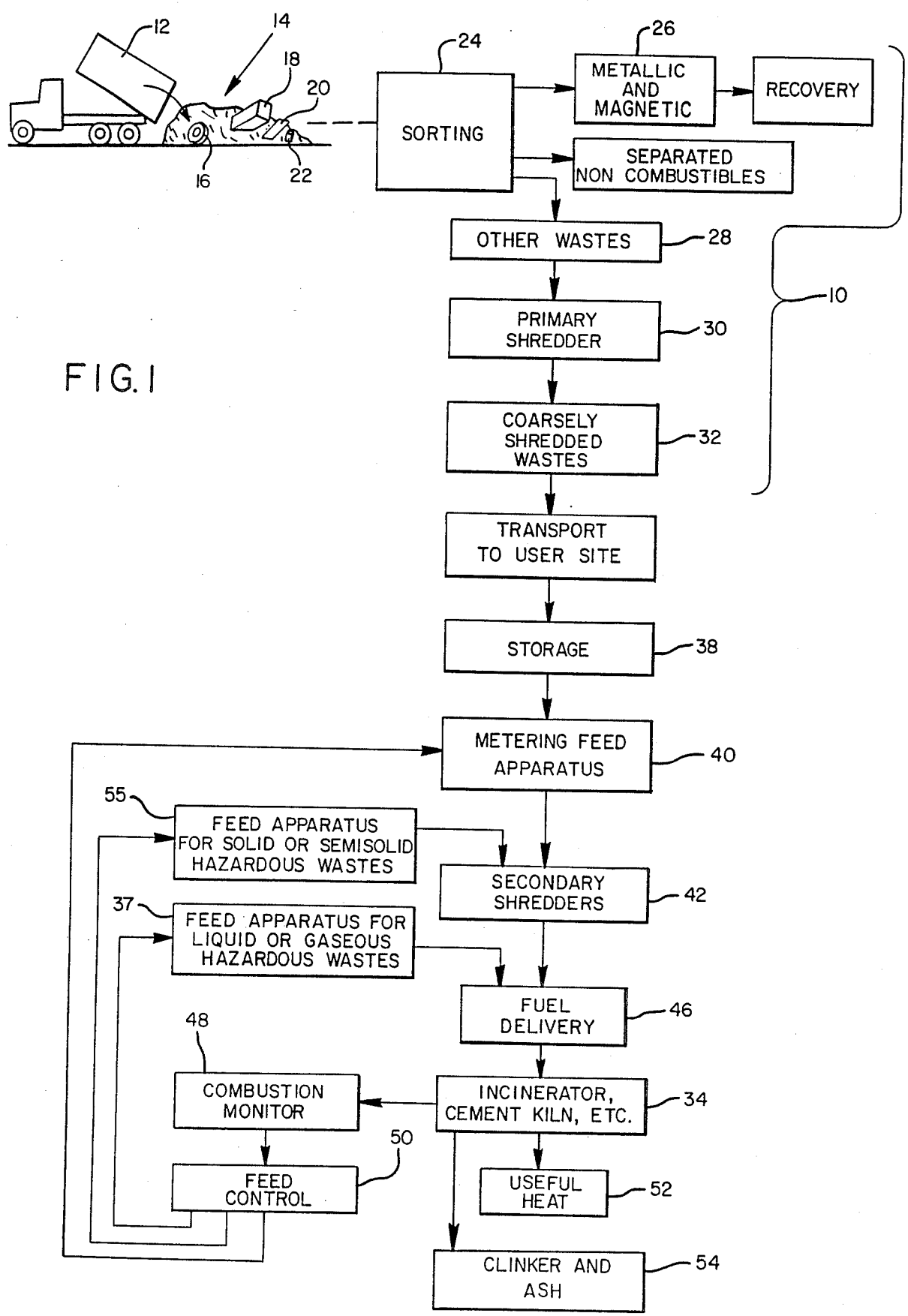
FIG. 1 is a block diagram representing the process of processing waste materials according to the present invention.

Referring now to FIG. 1 of the drawings, wherein a preferred embodiment of the invention is represented in block diagram form, municipal waste materials are collected at a central collection site 10, to which they are transported by various methods including, for example, using a trash collection truck 12 which deposits waste material in a temporary deposit area 14. The waste materials thus collected may include articles of many various types, such as discarded paper and fabric goods derived from normal residential household waste. Additionally such items as tires 16, discarded household appliances 18, and other materials such as scrap wood, plywood, corrugated paper board 20 or tin cans 22 may be included among the waste materials normally expected to be collected. Because some of these materials are useful otherwise, but not useful as fuel, a first step in the process of disposal of such waste materials is to sort the materials, as indicated at 24, removing magnetic materials to the extent possible by the use of magnets, and performing other sorting operations which do not form a part of the present invention. Such sorting may need to be done manually, or may be performed mechanically, at least in part. The materials thus removed, indicated at 26, may be handled as desired, and their disposal is not a part of the present invention.

The waste materials 28 remaining after the sorting operation indicated at 24 are first treated according to the present invention by being reduced in size mechanically, as by being passed through a primary shredder 30. It will be understood that such a primary shredder may be machinery of any construction capable of reducing such waste materials of assorted types into smaller pieces, but is called a shredder herein for the sake of convenient reference. One type of apparatus which is suitable for this purpose, with respect to most materials to be expected to be collected in municipal wastes, is described in Rouse, et al., U.S. Pat. No. 4,560,112, whereof the disclosure is hereby incorporated herein by reference. Depending on the design of the primary shredder 30, it may be desirable to pass the waste materials more than once through the primary shredder, or through two or more successive stages of similar machinery, the object being to reduce the size of large pieces of waste materials somewhat, to produce pieces small enough to settle closely together as a significantly denser quantity of coarsely shredded wastes 32, having pieces of more uniform size whose maximum dimension is, for example, no more than 18 inches, but the majority of whose pieces have no dimensions greater than, for example, about 8 inches. Such coarsely shredded wastes 32 may be handled easily as bulk materials, using conventional belt or pan conveyors, or bucket loaders, rather than handling individual pieces of waste material separately. The coarsely shredded wastes are transported from the primary shredder 30, or from an accumulation of such coarsely shredded wastes in the vicinity of the primary shredder 30, to the location of a burner 34 in which the coarsely shredded waste materials are to be consumed as combustion fuel, before any further processing of the materials is accomplished. However, the sorting operation described above may, optionally, be carried out after the collected waste materials 14 have been treated in the primary shredder 30. An additional step of sorting may also be performed, after primary shredding has been performed, to remove additional non-combustible material which may have been separated from combustible material as a result of operation of the primary shredder 30 on the waste materials.

Because the coarsely shredded wastes 32 have been increased in density, relative to their density when collected, it is more economical to transport them by truck to the site of the burner 34, as indicated at 36, than if those materials had not been reduced to smaller sized pieces by the primary shredder 30.

The coarsely shredded wastes 32 are preferably delivered to a storage and feed bin 38 located closely adjacent the burner 34. They are delivered from the storage and feed bin 38 (see FIG. 2) by a metering feed apparatus 40, to a secondary size reduction apparatus 42. The secondary size reducing apparatus is preferably of a type including a size-limiting screen member, for example, the granulator manufactured by Cumberland Engineering Company, a division of Leesona Corp., of Attleboro, Mass., as its Model 3250 granulator, or it may be of a design similar to that of the primary shredder 30, but of smaller dimensions. The capacity of the secondary apparatus 42 is chosen so that it is capable of reducing the size of individual pieces of the coarsely shredded wastes 32 most economically in view of the fuel demands of the burner 34. The secondary size reduction apparatus 42 is preferably of a design particularly adapted to reduce the size of pieces of coarsely shredded wastes of the predominant type of material available.

Figure 2:
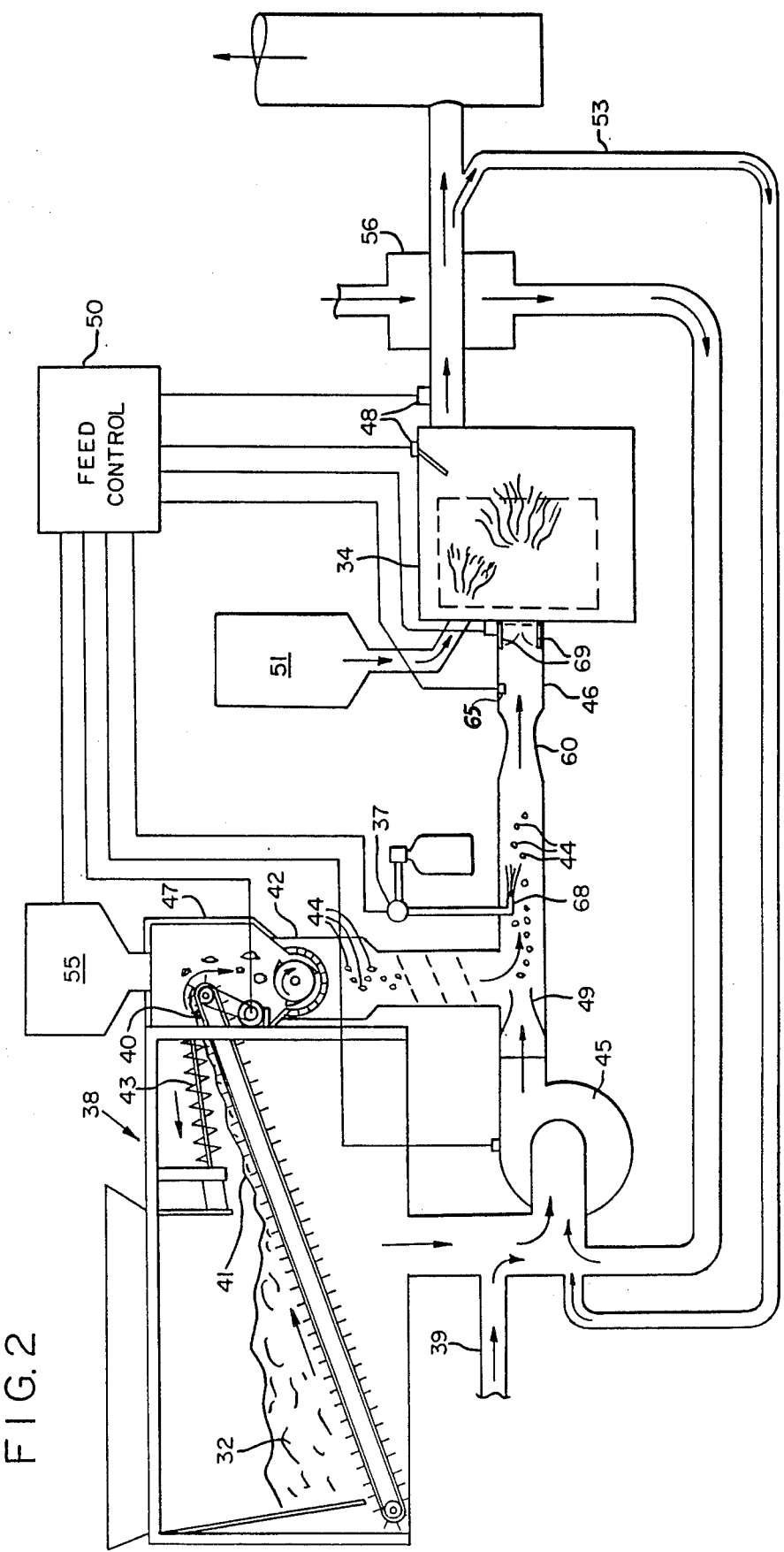
FIG. 2 is a partially schematic depiction of a burner and a shredder associated therewith and arranged for feeding waste materials into the burner in accordance with the invention.

As shown more particularly in FIG. 2, the metering feed apparatus 40 may include an upwardly inclined pan conveyor 41 to carry the coarsely shredded waste materials 32 upward from the collection bin 38, while a pair of leveling screws 43, located a predetermined distance above the upper end of the pan conveyor 41, are rotated continuously so as to oppose the movement of the coarsely shredded waste materials 32 above a certain height relative to the pan conveyor 41, to maintain the rate of delivery of coarsely shredded wastes 32 to the secondary size reducing apparatus 42. Coarsely shredded waste materials 32 are thus delivered to the secondary size reduction apparatus 42 at the rate established by the speed of the pan conveyor 41.

The objective of the secondary size reduction is to reduce the size of individual pieces of the coarsely shredded wastes 32, so that the total surface area of the pieces is increased, promoting better combustion, and to make individual pieces small enough to be transported in a stream of gas. The coarsely shredded wastes 32 are thus transformed in the secondary size reduction apparatus 42 into waste-derived, prepared fuel 44 with substantially all of the pieces of the prepared fuel 44 having maximum dimensions less than a maximum size which is determined by the type of material and the type of burner. The prepared fuel 44 is transported in a stream of moving gas produced by a blower 45, through a conduit system 46 arranged to deliver the waste-derived, prepared fuel 44 from the secondary size reduction apparatus 42 immediately and directly to the burner 34.

Preferably, at least part of the stream of gas used to transport the prepared fuel 44 is made up of air drawn from an enclosure 47 at least partially covering the pan conveyor 41 and the secondary size reduction apparatus 42. This helps to reduce the amount of dust which might otherwise be produced as a result of the operation of the pan conveyor 41 and secondary size reduction apparatus 42. Additionally, any odors produced by the prepared fuel 44 and coarsely shredded wastes 32 may be controlled thereby. Similarly, portions of the stream of gas may be provided by drawing air into the blower 45 from the vicinity of other nearby odor-producing factories, etc., as indicated schematically at 39. The prepared fuel 44 would ordinarily be introduced into the stream of gas in a zone of low pressure developed in the conduit 46 as by a Venturi nozzle arrangement located at 49 in FIG. 2, or through a device such as, for example, the triple gate valve disclosed in Rouse, et al., U.S. Pat. No. 4,561,467.

A secondary Venturi nozzle effect is provided at 60, downstream from the last point of introduction of any material into the stream of gas, by a slight constriction in the conduit 46, which provides resistance against minor backpuffs from the burner 34, to prevent disruption of the flow of materials included in the stream of gas and wastes being sent into the burner 34.

Gaseous or liquid hazardous wastes which can be rendered harmless by exposure to sufficiently high temperature conditions of sufficient duration may be introduced into the stream of gas at this point, preferably through an injection nozzle 68 as shown in FIG. 2, to be carried into the burner 34 to be rendered safe by such incineration, or they may be introduced in a zone of low pressure on the intake side of the blower 45. The rate of introduction of such hazardous materials is preferably controlled, as by the valve 37. Solid or semi-solid hazardous wastes capable of being rendered harmless by incineration may be introduced by appropriately controllable apparatus designated as 55, which delivers such materials to the secondary size reducing apparatus 42 in small quantities, so that it becomes a small part of the prepared fuel 44.

Figure 3:
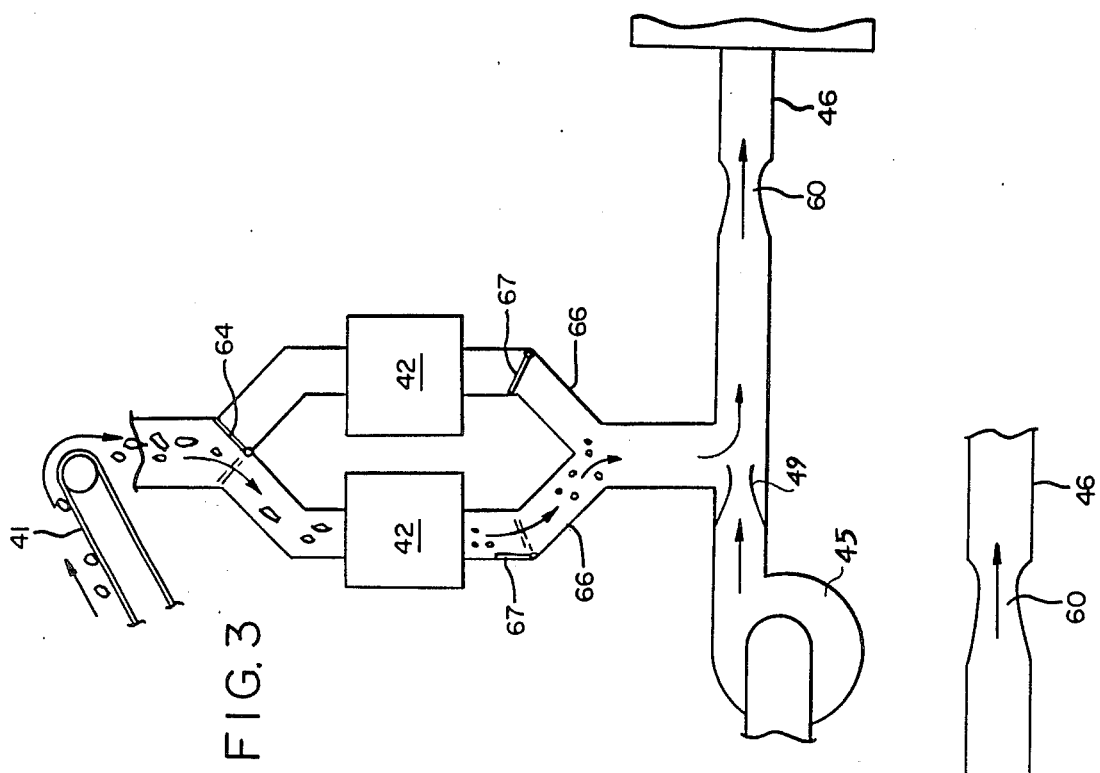
FIG. 3 is a simplified schematic diagram showing an arrangement for use of two secondary size reduction apparatuses in accordance with the invention.

Ideally, a pair of similar machines 42 are provided so that one can be used during repair or adjustment of the other, as shown schematically in FIG. 3, with a split conduit or chute down from the feed conveyor 41 being provided and having a diverter gate 64 to permit selection of either shredder. Appropriate sections of conduit 66 are provided, and cut-off valves 67 are provided below each of the machines 42 to isolate either of the secondary size reduction machines 42 during maintenance and repair work. The sections of conduit 66, below the cutoff valves 67, join each other in a "Y" upstream of the conduit 46.

Figure 4:
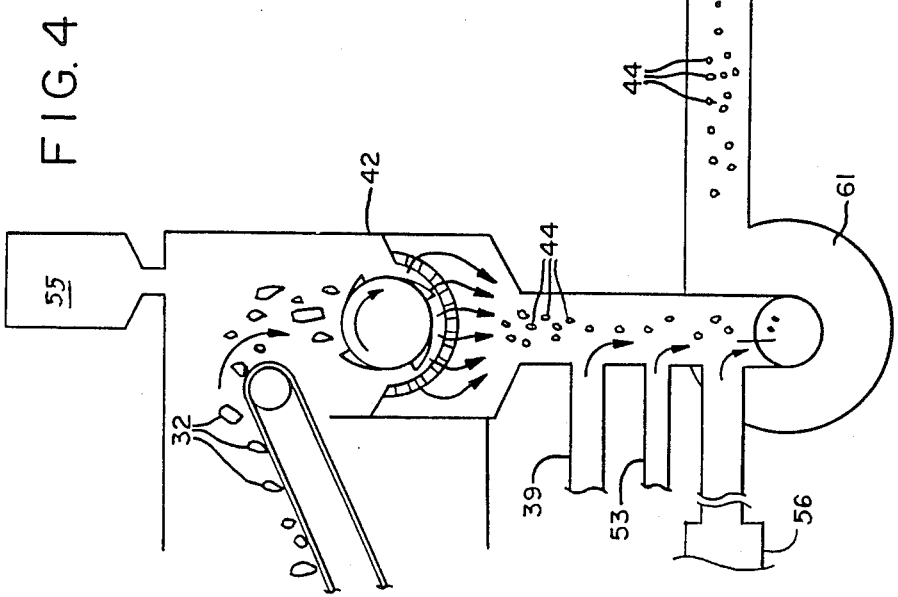
FIG. 4 is a partially schematic depiction of an alternative arrangement for induction of fuel into a blower for delivery to a burner in accordance with the invention.

As shown in FIG. 4, it may be desirable to introduce prepared fuel 44 into the conduit 46 by introducing it directly into the intake of a blower 61, from the secondary size reducing machine 42, which serves the purpose of positively accelerating motion of the prepared fuel 44 as it enters the conduit 46, and also enhances the efficiency of operation of the secondary size reduction apparatus 42 as a result of the flow of the air through it into the blower 61.

The burner 34 may be a municipal waste incinerator adapted to produce heat useful for generating steam for municipal heat generation or for generation of electrical power. Alternatively, the burner 34 may be the furnace of a lime kiln or a cement kiln producing clinker from which cement may be produced, in which case it may be desired to use such waste derived, prepared fuel 44 only as a supplement for a primary fuel 51 such as coal, oil, or gas, with quantities of the waste-derived, prepared fuel 44 used being limited to that which can be incorporated in the product of the cement or lime kiln without detriment to the quality of the product resulting from the ash produced by combustion of the waste-derived, prepared fuel 44.

The combustion process in the burner 34 is monitored by appropriate exhaust gas analyzing sensors and combustion zone temperature sensors indicated collectively as a combustion monitor 48, which is connected to provide appropriate electrical indications of the observed conditions within the burner 34 to a feed control device 50. Such a feed control device 50 may be of known design, including programmable apparatus arranged to provide controlling electrical output signals to the metering feed apparatus 40, as by electrically controlling the speed of operation of the pan conveyor 41, in response to the conditions sensed by the combustion monitor 48, so as to provide a proper rate of delivery of waste-derived, prepared fuel 44 to develop and maintain the required combustion temperature and fuel-air mixture required for complete and acceptably clean combustion of the waste-derived, prepared fuel 44 and any other fuel 51 used to fire the burner 34, or to control the amount of useful heat output 52 produced by the burner 34. The feed control apparatus 50 may also be connected electrically to control the feed apparatus 55 for introduction of solid or semi-solid hazardous waste materials into the secondary size reduction apparatus 42. It can also be connected to operate the valve 37 or other feed controlling apparatus to regulate the delivery of liquid or gaseous hazardous wastes into the stream of gas used to deliver prepared fuel 44 to the burner 34.

Additionally, sensors for detection of excessive pressure or temperatures are desirably provided in the conduit 46 adjacent the burner 34, as at 65, so as to transmit signals electrically to the feed control apparatus 50 so that feed can be stopped and the blower 45 shut down thereby in response to indications of backpuffing, explosions within the burner 34, or other unsafe conditions thus detectable. An emergency shut-off valve 69, preferably including provision for relieving dangerously excessive pressure from within the burner 34, is provided at the point of entry of the conduit 46 into the burner 34, and is controllably connected to the feed control apparatus 50 to be closed, interrupting the stream of material in the conduit 46 in response to detection of unsafe conditions by the sensor 65.

In order further to promote efficiency and completeness of combustion, a significant part of the stream of gas used to convey the prepared fuel 44 into the burner 34 is preferably heated gas. Some of such heated gas may be provided by using a portion of the exhaust gas from the burner 34, conducting it through a conduit 53 to the blower 45. This heated gas preheats the prepared fuel 44 and permits the size of the stream of gas used to carry prepared fuel 44 to be larger than otherwise would be practical because of the cooling effect of too much air introduced from the atmosphere at ambient temperatures, given the requirement for high combustion temperatures required to produce cement and lime, and to break down certain chemical compounds which would otherwise be dangerous if allowed to become part of the ash residue which must be disposed of, either as a component of cement produced or to be disposed of as landfill. It will be understood by one skilled in the field that the temperature of the stream of gas must not be high enough to ignite the prepared fuel 44 prematurely, and that the oxygen required for combustion of the prepared fuel 44 is not available in the exhaust gases which might be recycled directly. It may, then, be necessary in some cases to utilize a heat exchanger 56 to extract heat from gases exhausted from the burner 34 to preheat air in order to provide enough oxygen to combine with the fuel of the burner 34 without cooling the combustion zone unduly.

Since the coarsely shredded wastes 32 are denser than the prepared fuel 44, they are more accurately measureable and more easily metered during delivery into the secondary size reduction apparatus 42 than would be the prepared waste-derived fuel 44 whose smaller particle size typically results in lesser density and less uniformity because of the resiliency of paper and other fabric and fiber materials usually forming a large portion of metropolitan waste materials. By delivering the waste-derived, prepared fuel 44 immediately to the burner 34 after reduction to small particles in the secondary size reduction apparatus 42, however, the responsiveness of the feed control system including the feed controller 50 and the metering feed apparatus 40 is made to be adequate, particularly in the case of a continuously fed and operated limestone kiln or cement kiln fired only secondarily by the use of waste-derived, prepared fuel 44.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A method for providing combustible waste materials to a burner as fuel, comprising:
   (a) collecting waste materials at a collection site removed from the site of a burner;
   (b) sorting collected waste materials at said collection site to remove magnetic materials and other noncombustible materials therefrom;
   (c) shredding the remaining waste materials coarsely in a primary shredder at said collection site so as to produce coarsely shredded waste material pieces having a size reduced sufficiently to increase the density of said remaining waste materials;
   (d) thereafter transporting by wheeled vehicle said coarsely shredded waste materials to the location of said burner;
   (e) thereafter feeding quantities of said coarsely shredded waste materials into a secondary shredder at a predetermined rate;
   (f) immediately shredding the coarsely shredded waste materials fed into said secondary shredder, so as to produce prepared fuel therefrom at said predetermined rate; and (g) delivering all of said prepared fuel continuously and immediately to said burner for combustion therein.

2. The method of claim 1, including the further step of monitoring the combustion of said prepared fuel in said burner and adjusting said predetermined rate of feeding coarsely shredded waste material into said secondary shredder, in response to conditions observed while monitoring said combustion.

3. The method of claim 1 wherein step (a) includes collecting waste materials from residences.

4. The method of claim 1 wherein step (a) includes collecting waste materials from commercial businesses.

5. The method of claim 1 wherein said burner is a lime kiln.

6. The method of claim 1 wherein said burner is a cement kiln.

7. The method of claim 1 wherein said burner is a municipal waste incinerator.

8. The method of claim 1 wherein step (c) includes reducing the size of pieces of said collected waste material to a size wherein the largest dimension of substantially every piece is no greater than 18 inches.

9. The method of claim 1, including the further step of delivering said prepared fuel to said burner by carrying it suspended in a moving stream of gas.

10. The method of claim 1 wherein said coarsely shredded materials are predominantly in the form of pieces which are too large to be transported in a continuous stream of gas from said secondary shredder to said burner.

11. The method of claim 1 wherein substantially all of said prepared fuel is in the form of particles small enough to be transported efficiently in a stream of moving gas.

12. The method of claim 1 including the step of adding relatively small amounts of hazardous materials capable of being rendered harmless by incineration to said prepared fuel to be transported therewith into said burner.

13. The method of claim 1 including the step of introducing relatively small amounts of hazardous materials capable of being rendered harmless by incineration into said secondary shredder so that said hazardous materials are incorporated into said prepared fuel as a minor component thereof, to be transported to said burner.

* * * * *